(12) United States Patent
Gumprecht et al.

(10) Patent No.: US 8,376,394 B2
(45) Date of Patent: Feb. 19, 2013

(54) SIDE AIRBAG INSTALLATION IN A BACKREST OF A MOTOR VEHICLE SEAT

(75) Inventors: Michael Gumprecht, Nassenfals (DE); Jens Schebitz, Wunstorf (DE)

(73) Assignee: Faurecia Autositze GmbH (DE)

( * ) Notice: Subject to any disclaimer, the term of this patent is extended or adjusted under 35 U.S.C. 154(b) by 91 days.

(21) Appl. No.: 13/106,529

(22) Filed: May 12, 2011

(65) Prior Publication Data

US 2011/0278825 A1 Nov. 17, 2011

(30) Foreign Application Priority Data

May 12, 2010 (DE) .......................... 10 2010 020 341

(51) Int. Cl.
*B60R 21/201* (2011.01)
*B60R 21/207* (2006.01)
*B60R 21/2165* (2011.01)

(52) U.S. Cl. ................. 280/728.3; 280/728.2; 280/730.2
(58) Field of Classification Search ............... 280/728.2, 280/728.3, 730.2; 297/216.13; *B60R 21/201, B60R 21/207, 21/215, 21/2165*
See application file for complete search history.

(56) References Cited

U.S. PATENT DOCUMENTS

| | | | | |
|---|---|---|---|---|
| 5,498,030 A * | 3/1996 | Hill et al. | ................. | 280/743.1 |
| 5,749,597 A * | 5/1998 | Saderholm | ................. | 280/728.2 |
| 5,860,673 A * | 1/1999 | Hasegawa et al. | ......... | 280/730.2 |
| 5,893,579 A * | 4/1999 | Kimura et al. | ............. | 280/730.2 |
| 6,045,151 A * | 4/2000 | Wu | ............................. | 280/728.3 |
| 6,206,410 B1 * | 3/2001 | Brown | ........................ | 280/728.3 |
| 6,237,934 B1 * | 5/2001 | Harrell et al. | ............. | 280/728.3 |
| 6,588,838 B1 * | 7/2003 | Dick et al. | ................. | 297/216.13 |
| 6,626,455 B2 * | 9/2003 | Webber et al. | ............. | 280/728.2 |
| 7,195,277 B2 * | 3/2007 | Tracht et al. | ............... | 280/730.2 |
| 7,281,735 B2 * | 10/2007 | Acker et al. | ............... | 280/730.2 |
| 7,284,768 B2 * | 10/2007 | Tracht | ........................ | 280/730.2 |
| 7,290,791 B2 * | 11/2007 | Tracht | ........................ | 280/730.2 |
| 7,290,793 B2 * | 11/2007 | Tracht | ........................ | 280/730.2 |
| 7,311,325 B2 * | 12/2007 | Tracht et al. | ............... | 280/730.2 |
| 7,322,597 B2 * | 1/2008 | Tracht | ........................ | 280/728.3 |
| 7,325,825 B2 * | 2/2008 | Tracht | ........................ | 280/730.2 |
| 7,328,912 B2 * | 2/2008 | Tracht et al. | ............... | 280/730.2 |
| 7,334,811 B2 * | 2/2008 | Tracht et al. | ............... | 280/728.3 |
| 7,341,275 B2 * | 3/2008 | Miyake et al. | ............. | 280/730.2 |
| 7,377,542 B2 * | 5/2008 | Tracht et al. | ............... | 280/730.2 |
| 7,380,812 B2 * | 6/2008 | Tracht et al. | ............... | 280/728.3 |
| 7,543,847 B2 * | 6/2009 | Tracht | ........................ | 280/730.2 |
| 2006/0113764 A1 * | 6/2006 | Tracht | ........................ | 280/730.2 |

FOREIGN PATENT DOCUMENTS

DE 102004042039 A1 * 3/2006
FR 2866295 A1 * 8/2005
FR 2901756 A1 * 12/2007

* cited by examiner

*Primary Examiner* — Faye M Fleming
*Assistant Examiner* — Laura Freedman
(74) *Attorney, Agent, or Firm* — Robert W. Becker; Becker & Stachniak, P.C.

(57) ABSTRACT

A side airbag installation in a backrest of a motor vehicle, the backrest having a stuffing covered by a covering material. An airbag module is disposed in a recessed area of the backrest and is encased by an interior bag. A rigid component is disposed on the backrest and extends about the recessed area thereof. A first trimming profile can be inserted into a U-shaped trimming channel (18) of the rigid component (10) in a positively connecting manner. Free ends of the interior bag are connected to the first trimming profile via a tear seam. A second trimming profile is also insertable into the trimming channel in a positively connected manner. One end of the covering material is connected to the second trimming profile.

4 Claims, 4 Drawing Sheets

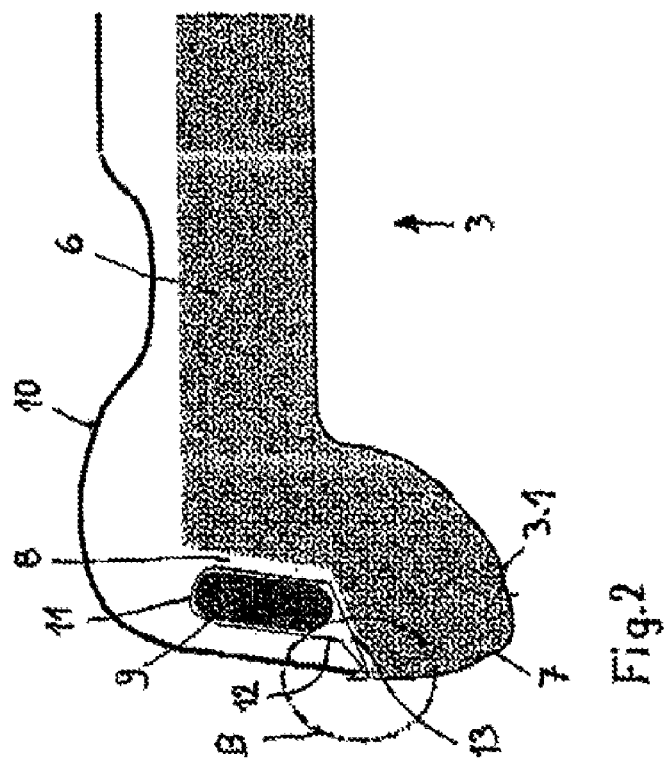
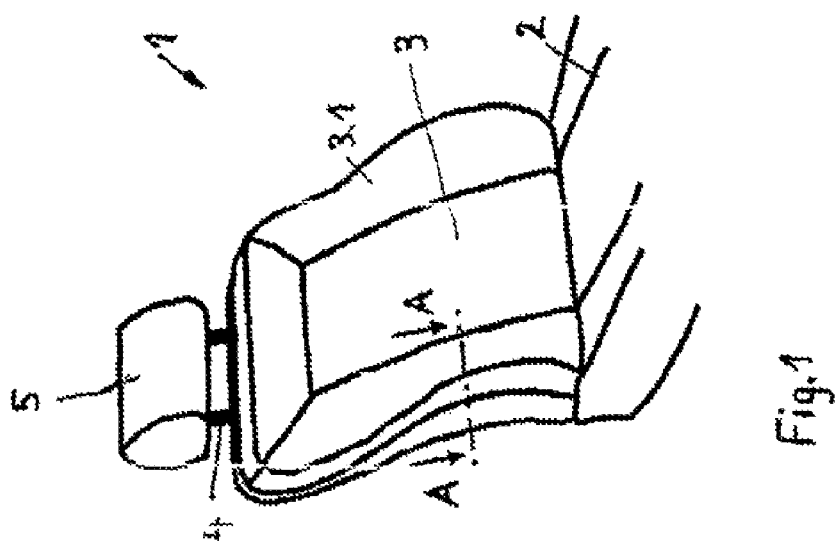
Fig. 1
Fig. 2

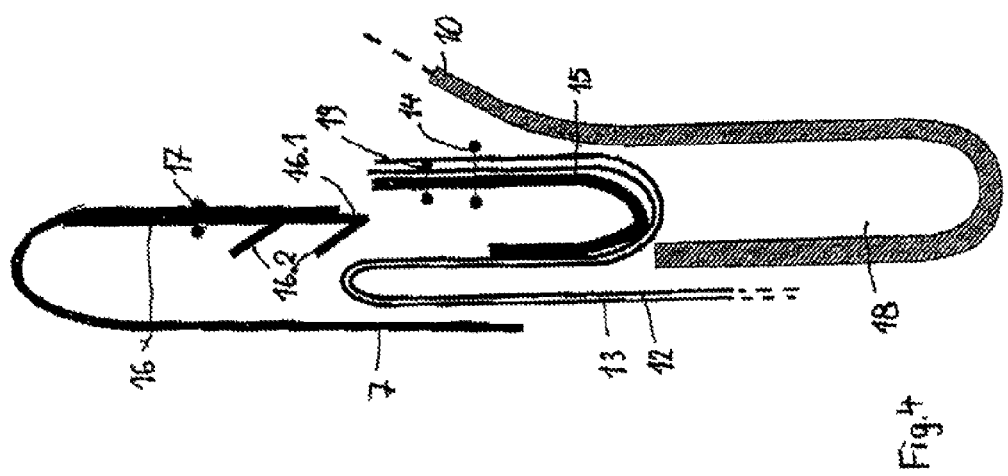
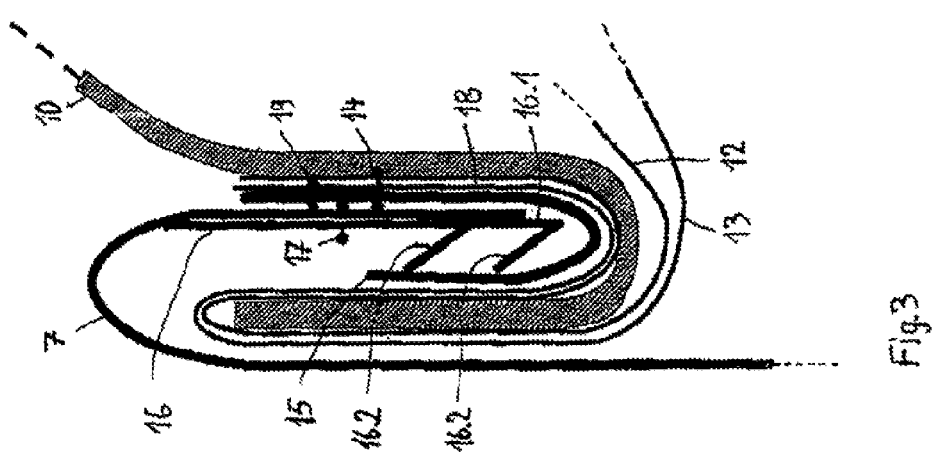

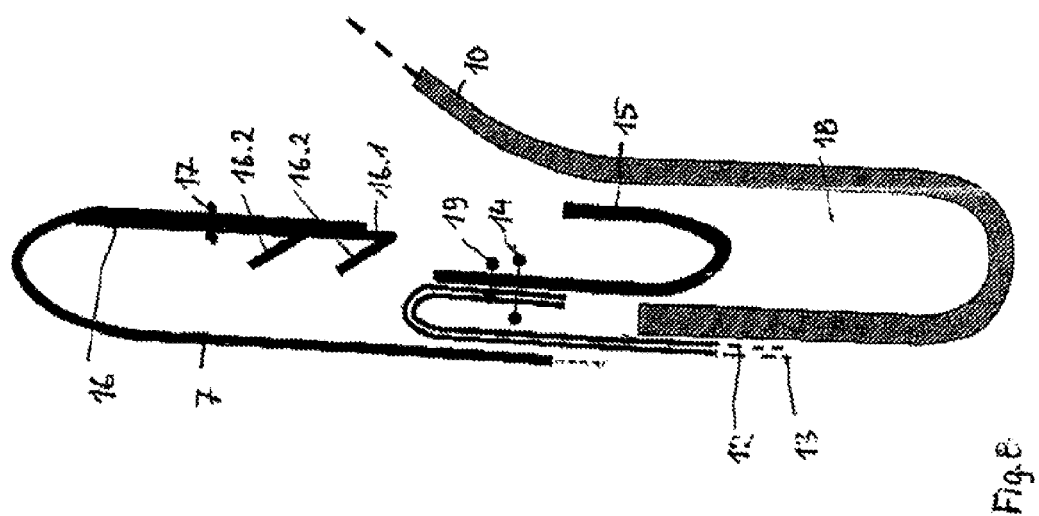
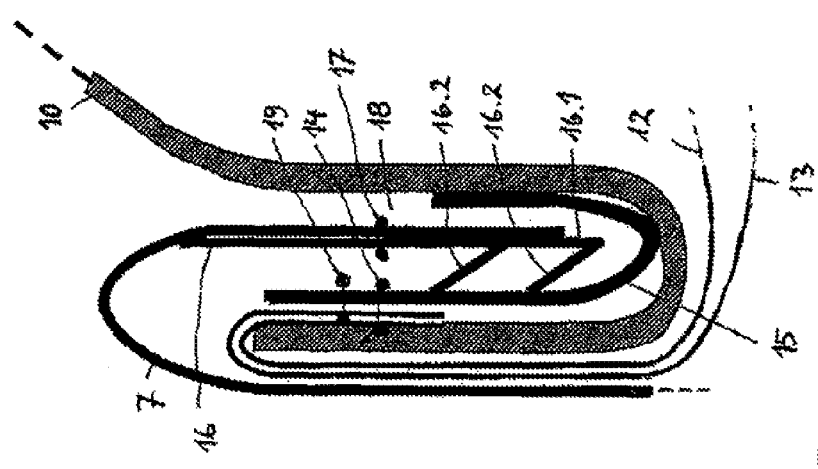

SIDE AIRBAG INSTALLATION IN A BACKREST OF A MOTOR VEHICLE SEAT

The instant application should be granted the priority date of 12 May 2010, the filing date of the corresponding German patent application 10 2010 020 341.6.

BACKGROUND OF THE INVENTION

The present invention relates to a side airbag installation of a backrest in a motor vehicle seat, wherein the backrest has a stuffing covered by a covering material.

Side airbag installations of this type are known, for example, from EP 963 310 B1 and DE 10 2004 042 039 A1.

With such installations, an airbag module is used that is provided with a housing in which are accommodated an airbag and a gas generator, and which has an outlet for the airbag, which in the event of actuation opens. In order to ensure the path of unfolding of the airbag, and to prevent the unfolding airbag from dragging along foam portions from the stuffing or upholstery of the vehicle seat, the airbag module is encased by an interior bag or pouch, a so-called concentrator, the free ends of which are sewn into a tear seam that is provided in a covering of the seat. This tear seam is visible from the outside, and must therefore have an optically attractive appearance.

It is an object of the present invention to provide a side airbag installation of the aforementioned general type that eliminates a binding of the free ends of the interior bag into the covering, yet ensures that the covering releases the exit path of the actuated airbag.

SUMMARY OF THE INVENTION

This object is inventively realized with a side airbag installation that comprises an airbag module disposed in a recessed area of the backrest, wherein the airbag module is encased by an interior bag having two free ends; a rigid component disposed on the backrest and extending about the recessed area thereof, wherein the rigid component is provided with a U-shaped trimming channel; a first trimming profile that can be inserted into the trimming channel in a positively connected manner, wherein the free ends of the interior bag are connected to the first trimming profile via a tear seam; and a second trimming profile that is also insertable into the trimming channel in a positively connected manner, wherein one end of the covering material is connected to the second trimming profile.

With the solution of the present invention, the free ends of the interior bag are no longer sewn into the covering, but rather are connected with a first trimming profile by means of a tear seam, wherein the first trimming profile is secured in position, in a positively connected manner, in a U-shaped trimming channel of a rigid component of the backrest. One end of the covering is connected with a second trimming profile, which is also secured in position in a positively connected manner in the U-shaped trimming channel. Hence, the covering is free of a tear seam, and the tear seam that is provided is disposed in a non-visible manner in the trimming channel. In the event of a crash, the unfolding airbag first fills the interior bag, as a consequence of which the two trimming profiles are levered or lifted out of the trimming channel, in other words, are carried along out of the trimming channel. As a result, on the one hand the covering is released, so that it is no longer in the path of the unfolding airbag; on the other hand, the airbag can exert force upon the tear seam, so that the latter is destroyed and the path is thus free for the air bag.

Pursuant to advantageous specific embodiments of the invention, the free ends of the interior bag can rest flat upon one another and be disposed between the first trimming profile and the trimming channel. In addition, the first trimming profile can have a U-shaped configuration, with the second trimming profile being insertable in a positively connected manner into the first trimming profile.

BRIEF DESCRIPTION OF THE DRAWINGS

The invention will be explained in greater detail subsequently with the aid of two exemplary embodiments. In the pertaining drawings:

FIG. 1 is a perspective view of an only partially illustrated motor vehicle seat, FIG. 2 is an enlarged basic illustration taken along the line A-A in FIG. 1, FIG. 3: is an enlarged detailed illustration of the encircled portion B in FIG. 2 in conformity with a first exemplary embodiment of the invention, FIG. 4: is an exploded view of the components of the installation of FIG. 3, FIG. 5: is an illustration pursuant to FIG. 3 with the airbag partially deployed, FIG. 7: is an enlarged detailed illustration of the encircled portion B of FIG. 2 in conformity with a second exemplary embodiment of the invention, and FIG. 8 is an exploded view of the components of the installation of FIG. 7.

DESCRIPTION OF SPECIFIC EMBODIMENTS

Figure 6:
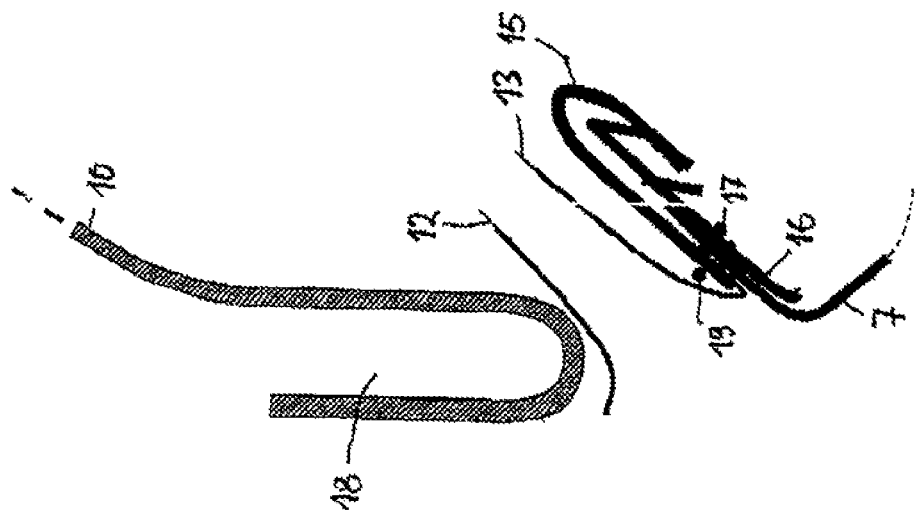
FIG. 6: is an illustration pursuant to FIG. 3 with the airbag completely deployed.

The features common to both exemplary embodiments will first be explained.

FIG. 1 shows a vehicle seat 1 having an only partially illustrated seat portion 2, a backrest 3, and a head support 5 that is supported on the backrest by means of supporting rods 4. As is customary the vehicle seat 1 is provided with a foam body 6 (FIG. 2), which is covered with a covering material 7. A recessed area 8 is provided on one side of the backrest 3 in the upholstery in order to provide space for an airbag module 9. Toward the rear, the backrest 3 is covered by a solid or hard shell 10, which in the region of the side rolls or wraparounds 3.1 of the backrest 3 is extended toward the front and laterally covers the installation location of the airbag module 9. Formed at the end of the backrest shell 10 is a U-shaped trimming channel 18 that is open toward the rear (see FIGS. 3-8).

As is customary, the airbag module 9 is comprised of a housing which accommodates a non-illustrated gas generator and a similarly non-illustrated, folded airbag. The airbag module is connected with a non-illustrated, adjacent side piece or strut of the backrest 3, for example by means of a screw connection. Such an arrangement is part of the state of the art and is therefore not illustrated.

The airbag module 9 has a casing in the form of an interior bag or pouch 11, which encases the airbag module 9 and has two ends 12 and 13, which in turn are connected via a tear seam 14 with a first trimming profile 15. The tear seam 14 is formed between one leg of the trimming profile 15 and the two free ends 12 and 13 of the interior bag 11. Furthermore, a safety or securing seam 19 is formed between this leg and the adjacent end 13 of the interior bag 11. The trimming profile 15 is made of polymeric material.

The end of the covering material 7 that is adjacent to the airbag module 9, as viewed with respect to the position of installation, is connected via a seam 17 with a second trimming profile 16, which is also made of polymeric material. The trimming profile 16 has a plate-shaped base 16.1 from which two spaced-apart ribs 16.2 project in a barbed-like manner.

The two embodiments differ from one another merely in that with the first embodiment of FIGS. 3 to 6, the free ends 12 and 13 of the interior bag 11 in the installed state essentially completely encase the two legs of the trimming profile 15 on the outer side, whereas with the embodiment of FIGS. 7 and 8, the ends 12 and 13 rest on the outside of only one leg of the trimming profile 15.

The installation of the two trimming profiles 15 and 16, with the free ends 12 and 13 of the interior bag 11, and with the secured covering material 7, respectively secured thereto, will be described subsequently with the aid of FIGS. 3 and 4, and 7 and 8.

First, the closed end of the U-shaped trimming profile 15 is pressed into the U-shaped trimming channel 18 of the backrest shell 10. In so doing, the free ends 12 and 13 of the interior bag 11, which rest flat against one another, are disposed between the outer side of the trimming profile 15 and the inner side of the trimming channel 18. The reciprocal dimensions of the trimming profile 15 and of the trimming channel 18 are selected such that the trimming profile 15 is jammed against the U-shaped trimming channel 18, with the ends 12 and 13 of the interior bag 11 being disposed between the trimming profile and the trimming channel.

The securement of the covering material 7 is effected subsequently. For this purpose, the trimming profile 16 is pressed into the trimming profile 15. In so doing, the fins or ribs 16.1 elastically yield somewhat. The reciprocal dimensions of the trimming profile 16 and the trimming profile 15 are selected such that the trimming profile 16 jams in the trimming profile 15. The barb-like projecting ribs 16.2 make it difficult to pull the trimming profile 16 out of the trimming profile 15, since during a pulling action on the covering material 7, the ribs thereby increasing the clamping or retaining force.

Figure 5:
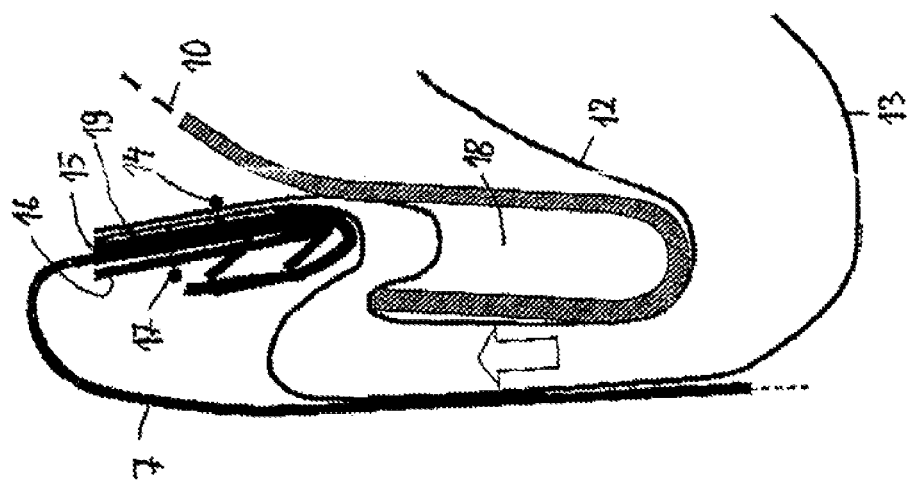

Upon actuation or triggering of the air bag, it first unfolds between the free ends 12 and 13 of the interior bag 11, as a consequence of which these free ends are also pressed apart in the region of the trimming channel 18 due to the increase in volume. The force resulting from this levers or lifts the trimming profiles 15 and 16 out of the trimming channel 18, as can be seen in FIG. 5. As soon as the tear seam 14 is exposed, this force acts upon the tear seam 14, so that it rips open and the air bag can unfold in the desired manner, as schematically illustrated in FIG. 6, which however does not show the unfolded air bag but only the free ends 12 and 13 of the interior bag 11 that are disposed in the unfolding path of the airbag. As a consequence of the securing seam 19, the trimming profile 15 remains connected to the free end 13 of the interior bag 11.

The deployment situation of the air bag is not illustrated for the second embodiment. The FIGS. 5 and 6 of the first embodiment, and the explanations pertaining thereto, are applicable in a corresponding manner for the second embodiment.

The specification incorporates by reference the disclosure of German priority document 10 2010 020 341.6 filed 12 May 2010.

The present invention is, of course, in no way restricted to the specific disclosure of the specification and drawings, but also encompasses any modifications within the scope of the appended claims.

What we claim is:

1. A side airbag installation in a backrest of a motor vehicle seat, wherein the backrest has a stuffing covered by a covering material, comprising:
   an airbag module disposed in a recessed area of said backrest, wherein said airbag module is encased by an interior bag having two free ends;
   a rigid component disposed on said backrest and extending about said recessed area thereof, wherein said rigid component is provided with a U-shaped trimming channel;
   a first trimming profile adapted to be inserted into said trimming channel in a positively connected manner, wherein said free ends of said interior bag are connected to said first trimming profile via a tear seam; and
   a second trimming profile that is also adapted to be inserted into said trimming channel in a positively connected manner, wherein an end of said covering material is connected to said second trimming profile.

2. A side airbag installation according to claim 1, wherein said free ends of said interior bag rest flat upon one another and are disposed between said first trimming profile and said trimming channel.

3. A side airbag installation according to claim 1, wherein said first trimming profile has a U-shaped configuration.

4. A side airbag installation according to claim 3, wherein said second trimming profile is adapted to be inserted into said first trimming profile in a positively connected manner.

* * * * *